Figure 1:
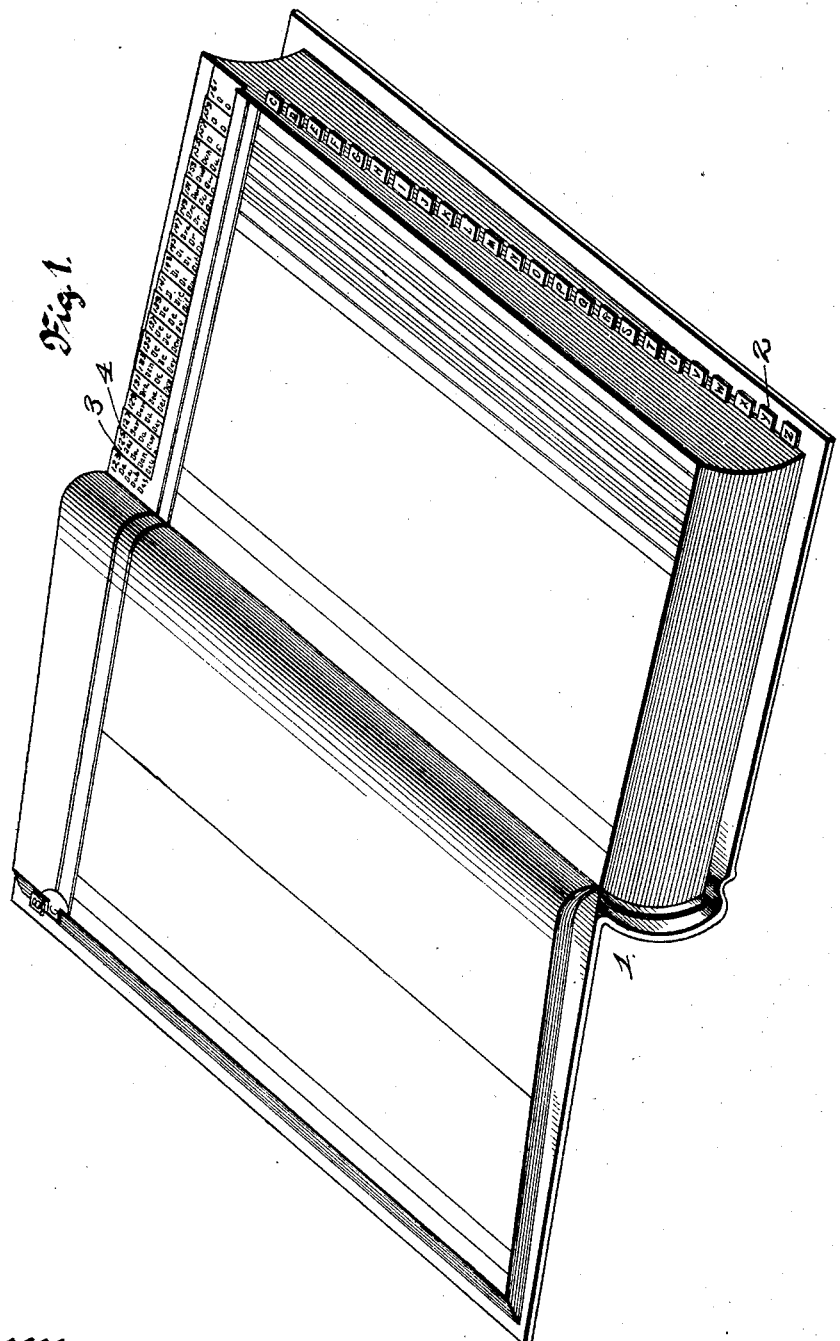

No. 711,249. Patented Oct. 14, 1902.
S. B. KIRTLEY.
SELF INDEXING LEDGER.
(Application filed Apr. 8, 1901.)
(No Model.) 2 Sheets—Sheet 1.

No. 711,249. Patented Oct. 14, 1902.
S. B. KIRTLEY.
SELF INDEXING LEDGER.
(Application filed Apr. 8, 1901.)

(No Model.) 2 Sheets—Sheet 2.

*Fig. 2.*

*Fig. 3.*

Witnesses
Alfred O. Tinker
John H. Rippey

Inventor
Simeon B. Kirtley
By Higdon & Longan attys

UNITED STATES PATENT OFFICE.

SIMEON B. KIRTLEY, OF JEFFERSON CITY, MISSOURI.

SELF-INDEXING LEDGER.

SPECIFICATION forming part of Letters Patent No. 711,249, dated October 14, 1902.

Application filed April 8, 1901. Serial No. 54,873. (No model.)

*To all whom it may concern:*

Be it known that I, SIMEON B. KIRTLEY, of Jefferson City, Cole county, State of Missouri, have invented certain new and useful Improvements in Self-Indexing Ledgers, of which the following is a full, clear, and exact description, reference being had to the accompanying drawings, forming a part hereof.

This invention relates to indices in ledgers; and it consists of the novel construction, combination, and arrangement of parts hereinafter shown, described, and claimed.

One object of this invention is to provide a system of indices for ledgers and books, the said system to consist of a primary, a secondary, and a tertiary index arranged integral with the book in which they are to be used and to use the said indices in combination with the page-numbers, which are printed upon the same cut-away sections of the indexed leaves.

A further object is to provide means whereby an account which has filled up the space allotted to it and has been transferred to another part of the book may be turned to at once without referring to the first page upon which it has been entered and without altering the printed scale.

Other objects and advantages will appear from the following description.

In the drawings, Figure 1 is a view in perspective of a ledger, showing the features of my invention. Fig. 2 is a detail view showing the arrangement of the secondary and tertiary indices and also the alternate page-numbers which are embodied in my invention. Fig. 3 is a detail view of the first page of a series of pages assigned to a particular letter.

In carrying out this invention the book or ledger 1 is divided alphabetically, a proper number of pages being assigned to each letter of the alphabet, the number assigned to each individual letter varying in proportion to the frequency of its occurrence and in proportion to the number of pages in the book. In other words, those letters which are of frequent occurrence as initial letters are given a greater number of pages than are those which are of rare occurrence. The first page of each series of pages assigned to each individual letter is used as an index-page, and each of these pages is provided with an index-tab 2, secured in any suitable manner to the edge of the page, which tabs afford a means of turning with facility to any initial letter at any point within the ledger. The upper end of the second page allotted to each initial letter is cut away, as indicated by 3, thereby making a rectangular excision which extends from a given line to the right of the page. This exposes to view the sheet next following, which is also provided with a cutaway, as indicated by 4, which, however, begins at a suitable distance to the right of the preceding cut away, thereby exposing to view a part of the said sheet upon which is printed the second and third letters of the names whose accounts are assigned to that particular page. Each succeeding sheet assigned to each particular letter as an initial letter is in like manner cut away, the cutaway in each sheet beginning at a suitable distance to the right of that in the preceding sheet. The arrangement of these cutaways is best shown in Figs. 1 and 2. In this case the ledger is open at the index-letter "D," the first page (122) being entire, and on this page are written the names of all persons whose initial letter is "D" and who have accounts to be entered in the ledger. A portion of each succeeding sheet is exposed to view, and on these exposed portions are printed the page-numbers. For example, the ledger, as shown, is open at page 123, which is the first page exposed to view on a cut-away sheet, the second is 125, the third is 127, and so on throughout the entire number of pages alloted to the letter "D," which in this case extends to 161, this letter requiring a large number of pages, since it is of frequent occurrence as an initial letter. On these exposed portions below the page-numbers are printed the initial letters, so that the letter "D" appears a number of times on each exposed portion of every sheet which is alloted to the letter "D" as an initial letter. Also on these exposed portions are printed the letters which may occur as the second and third letters in names having the letter "D" as an initial, the letters being printed in their alphabetical order and varying in accordance with the frequency of their occurrence as second and third letters in names beginning with "D."

For example, the letter "a" is of frequent occurrence as the second letter in such names, and "v" is often the third letter. Accordingly at one or more places on the exposed portions the letters "a v" are printed adjacent to the initial letter "D," and these letters in the present case are shown on page 127 and are the first three letters of the names. Similarly "r a" occur frequently as the second and third letters in names having "D" as the initial letter, and consequently are printed in one or more spaces and in the present case are assigned to page 147. The second and third letters are thus arranged adjacent to the initial letter when such letters can be anticipated. It frequently happens, however, that it is necessary to enter a name of which the third letter cannot be anticipated in the manner above set forth, but the second letter of which must necessarily be one of a limited number of letters of the alphabet. I provide for such emergency by printing adjacent to the initial letter in regular order on certain of the exposed portions those letters which of necessity must be the second letter of those names. For example, the letter "e" is of frequent occurrence as the second letter in names beginning with "D," and it is impossible in some cases to anticipate which letter will occur as the third letter in the name. For example, "Devin" is not a common name, and consequently the letter "v" is not printed on any of the exposed portions after the letter "e," but the first letter "D" and the second letter "e" are printed together on certain of the exposed portions, with a blank space to their right for the reception of the letter "v" or such other letter as may occur which it has not been anticipated will be used as a tertiary index. This letter may be inserted by pen or pencil in its proper place, and by this means a very flexible index is made, and any name beginning with "De" can be assigned to the page allotted to the letters "De" as primary and secondary indices, and the third letter constituting the tertiary index can be added when necessary. By such arrangement a primary, secondary, and tertiary index is formed, and by means of these any name which has been entered in the book can be very readily turned to without turning to the index-page allotted to each individual letter. When it is desired to turn to any name beginning with "D," the index-tab D is raised, which exposes to view the first, second, and third letters of the name and the number of the page upon which it has been entered, and it my be turned to with one movement of the hand. Thus it is seen that my invention consists in placing on these exposed portions the primary index-letter or initial, together with all the letters of the alphabet which occur as the second letters of names after each initial letter, and in placing adjacent thereto all the letters which I anticipate as the third letters of the names. It will also be seen that there is a blank space above and below these letters in which the page-number can be entered when the account is transferred, and any account may be transferred without altering the indices on the exposed portion of the page to which it was previously allotted—for example, the name "Dinwiddie," which occurs regularly on page 143, as may readily be seen by referring to the index on the exposed portion of this page on which appear the letters "Din," these letters being the first, second, and third letters of the name. The account has filled up the space alloted to it on page 143 and it has been necessary to transfer it to another page. After filling the space allotted to it on page 143 it was transferred to page 159, and to ascertain this fact it is only necessary to place over or under the letters "Din" on the index portion of page 143 the page-number 159, which obviates the necessity of turning to page 143 to discover the page to which it was transferred. The first page of those allotted to each letter is left for an index-page, and all names beginning with that letter are written on that page, and in alinement with each name is the number of the page upon which it is written and the page to which it has been transferred. The name of "Dinwiddie," above mentioned, is written on the first page (122) allotted to the letter "D" and after the name is written the page (143) upon which the account is first entered. After the name was transferred to page 159 this number was likewise written there, and by this means a double index is made, either of which may be used by the operator. These improvements save much cost in the construction of a book, as it does away with the necessity of changing the printed scale to allow for long accounts, as these accounts are quickly transferred by numbers. Much time and labor are also saved, since the index-letters do not have to be reëntered on the cutaways in transferring the accounts.

The above system of indices possesses superior advantages over others heretofore constructed with the same end in view.

In my invention I employ a primary, secondary, and tertiary index, all arranged integral with the book and to embody which it is only necessary to make use of one cutaway portion on each leaf or sheet in the book; also, the combination of the primary, secondary, and tertiary indices with the page-numbers affords a very useful and convenient means of turning to any name much more quickly than does an index in which the page-numbers do not appear on the same section of the leaf with the secondary and tertiary indices. Furthermore, the separate index on the first leaf of the series allotted to each letter may be made use of when found desirable, thereby dispensing with the secondary and tertiary indices.

It is manifest that I may use other index-letters besides the first, second, and third letters in combination with the page-numbers, and I do not desire to be limited to the exact construction shown and described, since the different arrangements would be mere colorable evasions and not material changes. By practical experience I have found that a book or ledger having the primary, secondary, and tertiary index-letters shown adjacent to the page-number on each leaf is much more useful and convenient than those in which it is necessary to turn to the index to find the page of each account. Hence it is seen that I have provided an improved index the essential features of which consist in a series of cut-away leaves for each initial letter and the primary, secondary, and tertiary index characters indicated on the exposed portions of the cut-away leaves and adjacent to the page-numbers.

It will be observed by referring to Fig. 2 that the initial letter occurs alone in certain of the exposed portions, and those portions form what might be termed "emergency indices" for the reception of those names the second letter of which cannot be anticipated. It will also be seen by referring to the right-hand side of Fig. 2 that a number of exposed portions contain no secondary and tertiary indices and have blank spaces to the right of the index-letter, so that any account may be transferred to those pages and may readily be found by inserting in the proper place the secondary and tertiary letters, as above described.

I do not herein claim my invention as applied to loose-leaf books or ledgers, as I have made the same the subject-matter of another application, filed July 28, 1902, Serial No. 117,411.

I claim—

1. A ledger or book having a series of cut-away leaves for each letter of the alphabet, a portion of each of the cut-away leaves being exposed, the initial letter being printed on all of said exposed portions as a primary index and all the letters of the alphabet which are to be used as secondary index-letters printed on certain of said exposed portions with the initial letter, and all letters of the alphabet which it is anticipated will be used as tertiary index-letters printed on said exposed portions with the initial and secondary index-letters, and the initial and secondary index-letters being printed without the tertiary index-letters on certain of said exposed portions and having suitable spaces adjacent thereto for the insertion of the tertiary letters the use of which has not been anticipated, and a blank space adjacent to said letters on each exposed portion in combination with the page-number on each exposed portion, whereby any account can be turned to without changing said letter or referring back to the index after the page-number to which the account was transferred has been indicated adjacent to the proper letters on the page from which the account was transferred, substantially as specified.

2. A ledger or book having a series of cut-away leaves for each letter of the alphabet, a portion of each cut-away leaf being exposed, the initial letter being printed a number of times on each exposed portion and having suitable spaces adjacent thereto on certain of said exposed portions for the insertion of the second and third letters of the names, and the second letter printed with the said initial letter on certain of said exposed portions with a space adjacent thereto for the insertion of the third letter of the name, and the first, second and third letters printed together on certain of said exposed portions, and a blank space adjacent to said letters on each exposed portion, in combination with page-numbers over said letters on each exposed portion, whereby any account can be turned to without changing said letters or referring back to the index after the page-number to which the account was transferred has been indicated adjacent to the proper letters on the page from which the account was transferred, substantially as specified.

3. A ledger or book having a series of cut-away leaves for each letter of the alphabet, a portion of each of the cut-away leaves being exposed, primary, secondary and tertiary index-letters printed together on certain of said exposed portions, and the primary index-letter being printed alone on certain of said exposed portions and having spaces adjacent thereto for the insertion of the secondary and tertiary index-letters which cannot be anticipated, and a blank space adjacent to the index of each account for the reception of the page-number when an account is transferred, in combination with page-numbers on the exposed portions of the cut-away leaves, for the purpose set forth.

4. A ledger or book having a series of cut-away leaves for each letter of the alphabet, a portion of each of the cut-away leaves being exposed, primary and secondary index-letters printed on certain of said exposed portions with blank spaces adjacent thereto to receive the third letter of the names, and the primary index-letter being printed alone in certain of said exposed portions and having spaces adjacent thereto for the insertion of the secondary and tertiary index-letters which cannot be anticipated, and a blank space adjacent to said letters on each exposed portion, in combination with page-numbers on the exposed portions of the cut-away leaves whereby any account can be turned to without changing said letters, after the page-number has been indicated adjacent to the proper letters on the page from which the account was transferred, substantially as specified.

5. A ledger or book having a series of cut-away leaves for the letters of the alphabet, portions of the said cut-away leaves being exposed, the initial letter with second and third letters of name printed on certain of said exposed portions and the initial letter printed only with the second letter on certain of said exposed portions with a space adjacent thereto for the insertion of the third letter of the name, and the initial letter being printed alone on certain of said exposed portions and having spaces adjacent thereto for the insertion of the second and third letters of the names, which cannot be anticipated, in combination with different identifying characters on the exposed portions of the different cutaway leaves, substantially as specified.

In testimony whereof I affix my signature in presence of two witnesses.

SIMEON B. KIRTLEY.

Witnesses:
ALFRED A. EICKS,
J. D. RIPPEY.